(12) United States Patent
Becker et al.

(10) Patent No.: US 7,384,238 B2
(45) Date of Patent: Jun. 10, 2008

(54) ROTOR, ROTOCRAFT COMPRISING A ROTOR OF THIS TYPE AND METHOD FOR ADJUSTING THE BLADE ANGLE OF A ROTOR

(75) Inventors: Gerold Becker, Maisach (DE); Rupert Pfaller, Riemerling (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 287 days.

(21) Appl. No.: 10/552,693

(22) PCT Filed: Apr. 6, 2004

(86) PCT No.: PCT/EP2004/003642

§ 371 (c)(1),
(2), (4) Date: Oct. 11, 2005

(87) PCT Pub. No.: WO2004/089747

PCT Pub. Date: Oct. 21, 2004

(65) Prior Publication Data

US 2006/0186263 A1 Aug. 24, 2006

(30) Foreign Application Priority Data

Apr. 8, 2003 (DE) .............................. 103 16 093

(51) Int. Cl.
*B64C 27/33* (2006.01)
(52) U.S. Cl. ........................................ 416/1; 416/134 A
(58) Field of Classification Search .................. 416/44, 416/51, 52, 134 A
See application file for complete search history.

(56) References Cited

U.S. PATENT DOCUMENTS

| 2,684,721 A | 7/1954 | Lloyd ..................... 170/160.13 |
| 2,757,745 A | 8/1956 | Verhage et al. ........ 170/160.25 |
| 3,108,641 A * | 10/1963 | Taylor .......................... 416/52 |
| 3,999,886 A | 12/1976 | Ormiston et al. ........... 416/104 |
| 4,678,923 A | 7/1987 | Trepanier .................... 290/55 |
| 5,730,581 A | 3/1998 | Buter et al. ................... 416/23 |

FOREIGN PATENT DOCUMENTS

| DE | 43 16 712 | 11/1994 |
| DE | 195 28 155 | 6/1996 |

OTHER PUBLICATIONS

International Search Report for PCT/EP2004/003642 (2 pages).

* cited by examiner

*Primary Examiner*—Richard Edgar
(74) *Attorney, Agent, or Firm*—Darby & Darby

(57) ABSTRACT

A rotor, in particular for a rotorcraft, encompassing: a rotor head, at least one rotor blade, and a rotor-head-end rotor-blade connector having an integral, bearingless, centrifugal-force-controlled blade angle adjustment device. A rotorcraft, in particular a helicopter, in particular a tiltrotor helicopter, encompassing at least one such rotor. A method for adjusting the blade angle of a rotor blade of a rotor, in particular of a bearingless rotor that possesses a rotor head and a rotor-head-end rotor-blade connector, encompassing the following steps: rotating the rotor blade; and automatically adjusting the blade angle by twisting the rotor-head-end rotor-blade connector, and thus the rotor blade, about its longitudinal axis by means of centrifugal forces acting on the rotor blade.

20 Claims, 4 Drawing Sheets

—————— Distribution of the Surface Centroid
— — — or Neutral Fiber

ROTOR, ROTOCRAFT COMPRISING A ROTOR OF THIS TYPE AND METHOD FOR ADJUSTING THE BLADE ANGLE OF A ROTOR

The present invention concerns a rotor, as well as a rotorcraft having such a rotor. The invention further concerns a method for adjusting the blade angle of a rotor blade of a rotor of this kind.

BACKGROUND

In previously known rotors that have a rotor head, at least one rotor blade, and a rotor-head-side rotor-blade connector, adjustment of the blade angle of the rotor blade is accomplished via a discrete bearing or via a torsionally soft element, with the aid of a rather complex, heavy adjustment mechanism that, as a rule, possesses at least one blade adjustment lever, a linkage, a swashplate, and at least one actuator for actuation of the mechanism. The aforesaid torsionally soft element is usually used in so-called bearingless rotors in combination with a so-called control bag. The torsionally soft element extends inside the control bag, which, in order to introduce a torque necessary for blade angle adjustment, is joined nonrotatably to the torsionally soft element at a distal end region thereof, i.e. facing toward a rotor-blade tip. For adequate torsional softness and in order to achieve a sufficiently large blade adjustment angle, the torsionally soft element and the control bag must be made relatively long. These components therefore occupy quite a large percentage of the rotor blade length, which is then no longer available for an aerodynamically effective profile of the rotor blade. Conventional bearingless rotors are moreover embodied in flapwise-soft fashion, which is disadvantageous for certain rotor types, for example tilting rotors (tiltrotors) that are utilized in tiltrotor helicopters or tiltrotor aircraft.

Whereas in conventional helicopters the rotation speed is kept relatively constant during operation and the blade angle is adjusted collectively or cyclically, it may be necessary in certain applications, e.g. for tiltrotor helicopters or tiltrotor aircraft, to adjust the blade angle of rotor blades or propellers as a function of rotation speed. In a tilting rotor, for example, in so-called aircraft mode the rotation speed is decreased and at the same time the blade angle is set to be steeper, while in so-called helicopter mode the rotation speed is increased and the blade angle is set to be flatter. The adjustment mechanisms and control and/or regulation devices necessary for this are, however, very complicated and weight-intensive and, because of the required coupling between a rotating and a stationary part of the adjustment mechanism, moreover must be accomplished via the interface of a swashplate, which is very complex in terms of control engineering and design.

SUMMARY OF THE INVENTION

An object and a technical problem underlying the invention is that of creating a rotor, in particular for a rotorcraft, that possesses improved aerodynamic properties with the lowest possible rotor weight, and that allows an adjustment of a rotor blade, including as a function of rotation speed, to be performed in simple and effective fashion. A suitable method for adjusting the blade angle of a rotor blade is also to be made available.

The present invention provides a rotor, in particular for a rotorcraft, encompasses a rotor head, at least one rotor blade, and a rotor-head- or rotor-mast-side rotor-blade connector having an integral, bearingless, centrifugal-force-controlled blade angle adjustment device. The rotor-blade connector can be an integral component of the rotor blade or a part separate therefrom that is joinable to the rotor blade, for example, via a suitable disconnect point. The rotor-blade connector can moreover also be part of a rotor-head element, e.g. of a rotor star or a rotor-head plate, or of another element interposed between the rotor blade and the rotor head or a rotor mast.

Because of the integral construction of the bearingless centrifugal-force-controlled blade angle adjustment device, the latter can be embodied as a direct component of the rotor blade or of its structural or mounting elements or of a rotor-head element. In other words, the blade angle adjustment device can be placed directly on or in the rotating parts of the rotor, or integrated into them. With the solution according to the present invention, therefore, unlike in the existing art, a centrifugal-force-controlled or rotation-speed-conditioned adjustment of the blade angle also does not require a coupling between a rotating and a stationary part of the adjustment mechanism via a swashplate. This considerably simplifies the design, and moreover results in a favorable weight reduction.

Adjustment mechanisms such as those necessary in the existing art for centrifugal-force-controlled, rotation-speed-dependent blade angle adjustment can thus be entirely dispensed with. As will become even clearer from the explanations below, complicated control and/or regulation devices for rotation-speed-conditioned blade angle adjustment are also not necessary. If one or more torsionally soft elements and a control bag are used for each rotor blade in the rotor according to the present invention, it is then possible to make these components considerably shorter; this in turn yields advantages in terms of aerodynamics, since the undisturbed, aerodynamically active profiled region of the rotor blade can be moved farther inward, i.e. toward the rotor axis. The flapping hinge distance and/or lead-lag hinge distance can also be reduced as a result of these actions, which is likewise advantageous for certain applications. If the flapping hinge region and/or lead-lag hinge region and the torsionally soft region of the blade connector or rotor blade is configured to be detachable from the so-called homogeneous rotor blade by way of a disconnect point (e.g. a bolt connector), that disconnect point likewise shifts inward toward the rotor axis into a region of lower incident flow velocities. This, too, is aerodynamically advantageous and permits a lighter construction.

Further preferred and advantageous embodiment features of the rotor according to the present invention are the subject matter of the claims.

According to a second aspect, the present invention provides a rotorcraft, in particular a helicopter, in particular a tiltrotor helicopter, comprising at least one such rotor. The rotorcraft according to the present invention offers substantially the same advantages that have already been explained above in connection with the rotor according to the present invention.

Furthermore, according to a third aspect, the present invention provides a method for adjusting the blade angle of a rotor blade of a rotor, in particular of a bearingless rotor that possesses a rotor head and a rotor-head-end rotor-blade connector, comprising the following steps: rotating the rotor blade; and automatically adjusting the blade angle by twisting the rotor-head-end rotor-blade connector, and thus the rotor blade, about its longitudinal axis by means of centrifugal forces acting on the rotor blade.

This method for adjusting the blade angle of a rotor blade of a rotor, in particular of a bearingless rotor that possesses a rotor head and a rotor-head-side rotor-blade connector, encompasses the following steps: rotating the rotor blade; and automatically adjusting the blade angle by twisting the rotor-head-side rotor-blade connector, and thus the rotor blade, about its longitudinal axis by means of centrifugal forces acting on the rotor blade. The magnitude of the blade angle can thus be modified as a function of the magnitude of the centrifugal force. The method according to the present invention offers substantially the same advantages that have already been presented above in connection with the rotor according to the present invention.

Preferred exemplifying embodiments of the invention, with additional embodiment details and further advantages, are described and explained in greater detail below with reference to the accompanying drawings.

DETAILED DESCRIPTION

Figure 1:
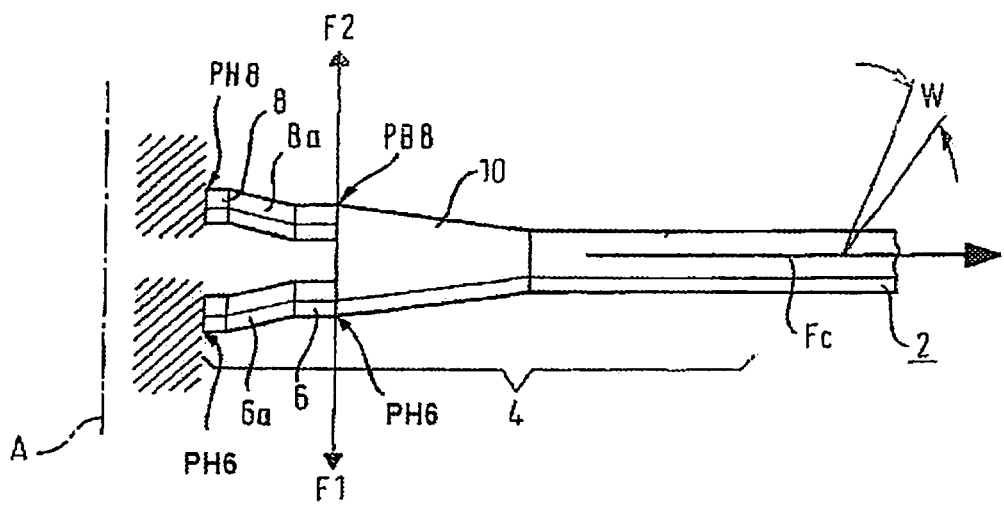
FIG. 1 is a schematic, greatly simplified perspective view of a substantial subregion of a rotor according to the present invention in accordance with a first embodiment.

In the description that follows and in the Figures, in order to avoid repetition, identical constituents and components will also be labeled with identical reference characters provided no further differentiation is necessary.

FIG. 1 is a schematic, greatly simplified perspective view of a substantial subregion of a bearingless rotor according to the present invention in accordance with a first embodiment. The rotor encompasses a rotor mast (not shown), a rotor head (not shown), multiple similarly configured rotor blades 2, and, for each rotor blade 2, a respective rotor-head-side rotor-blade connector 4 having an integral, bearingless, centrifugal-force-controlled blade angle adjustment device. At least rotor-blade connector 4 is manufactured very largely from fiber composite material. In this embodiment, rotor-blade connector 4 is a component of rotor blade 2 itself. The integral, bearingless, centrifugal-force-controlled blade angle adjustment device possesses two (or even more) rotor-blade connector arms 6, 8 that are impinged upon by centrifugal force during rotor operation, and that discharge centrifugal forces Fc acting on the rotating rotor blade 2.

Rotor-blade connector arms 6, 8 are configured as an integral component of rotor blade 2. Each rotor-blade connector arm 6, 8 can in principle comprise one or more arm segments that are disposed next to and/or above one another and can also fork. In the present case, rotor-blade connector arms 6, 8 are embodied as plate- or strip-shaped, flexurally and torsionally soft structural elements having a flat, rectangular cross-sectional shape. In principle, however, rotor-blade connector arms 6, 8 and their arm segments can also assume other suitable shapes and cross-sectional shapes, for example a square or round cross-sectional shape.

Rotor-blade connector arms 6, 8 extend next to one another, proceeding from a common foot region 10 that terminates in a rotor-blade neck 12, in a manner spaced apart from one another (i.e. spaced apart from one another in a tangential direction with reference to the rotor disc). They each possess at least one arm portion 6a, 8a that is stepped or bent contradirectionally with respect to the respective other rotor-blade connector arm. The two arm portions 6a, 8a are offset from one another in an axial direction with reference to rotor axis A, i.e. here they are contradirectionally stepped or bent downward and upward. The wide, plate-shaped foot region 10 is likewise configured in flexurally and torsionally soft fashion and, when viewed in plan, possesses a trapezoidal shape tapering toward rotor-blade neck 12. Foot region 10 is embodied in lead-lag-stiff and flapwise-soft fashion. In coaction with rotor-blade connector arms 6, 8, foot region 10 therefore constitutes a flapwise-soft but lead-lag-stiff rotor-blade attachment, which is advantageous in particular for tilting rotors.

As indicated in FIG. 1 by the reference character T, the regions forming the flapping hinge and/or lead-lag hinge, or torsionally soft regions, of rotor-blade connector 4 can also, if necessary, be embodied detachably from the so-called homogeneous rotor blade by way of a disconnect point (e.g. a bolt connector).

It is also evident from FIG. 1 that rotor-blade connector arms 6, 8 together form a kind of blade connector fork, whereby arms 6, 8 preferably extend to the left and right alongside to rotor axis A or a rotor mast. Rotor-blade connector arms 6, 8 are joined at the rotor-head side nonrotatably (and, optionally but not obligatorily, articulatedly) to a torque-transmission element (e.g. a rotor star or rotor-head plate or the like) which in turn is fixed nonrotatably on the rotor mast (not shown). In FIG. 1, the rotor-head-side connection points PH6, PH8 of rotor-blade connector arms 6, 8 are indicated, for the sake of simplicity, merely schematically by way of a crosshatched region. As is apparent from the drawing, rotor-head-side connection points PH6, PH8 are spaced apart from one another in axial direction A of the rotor. Connection points PB6, PB8 at the rotor-blade end that terminate in foot region 10, on the other hand, lie in a common plane in this example.

The rotor-blade connector arms 6, 8 of multiple rotor blades 2 can also be joined to one another (integrally or by way of separate joining elements) at one or more points, and in that context can cross over or overlap. Multiple such joining points, spaced apart from one another in the longitudinal direction of rotor blade 2, can form a virtual auxiliary flapping hinge. It is possible as a result for rotor-blade connector arms 6, 8 of a rotor blade 2 to absorb centrifugal forces Fc, or centrifugal force components, of an oppositely located rotor blade 2. The rotor-head attachment of rotor blades 2 is thus in fact centrifugal-force-free, and transfers only torques.

Figure 2:
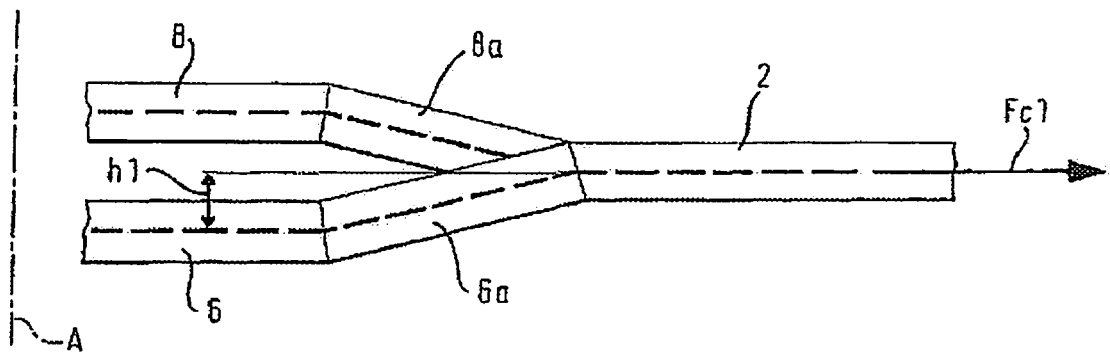
FIG. 2 is a schematic, greatly simplified side view of the rotor of FIG. 1.

FIG. 2 constitutes a schematic, greatly simplified side view of the rotor of FIG. 1. The stepping or bending of rotor-blade connector arms 6, 8 is particularly clearly apparent in this view. The stepping or bending on arm portions 6a, 8a is accomplished via an obliquely extending connectorarm region that here assumes a relatively flat, acute angle with respect to the vector of centrifugal force Fc and therefore the centrifugal force direction. In principle, however, the angle can also be larger, and can even assume values of 90 degrees or more. The aforesaid flat angles are nevertheless to be preferred in practice. It is apparent from the drawing that in rotor-blade connector arms 6, 8 that are shown, the respective surface centroid or neutral fiber of a rotor-head-side connector arm cross section is offset downward and upward, respectively, with respect to the respective surface centroid or neutral fiber of a rotor-blade-side connector and a vector of centrifugal forces Fc, or centrifugal-force direction, extending through that rotor-blade-end surface centroid during rotor operation.

Figure 7:
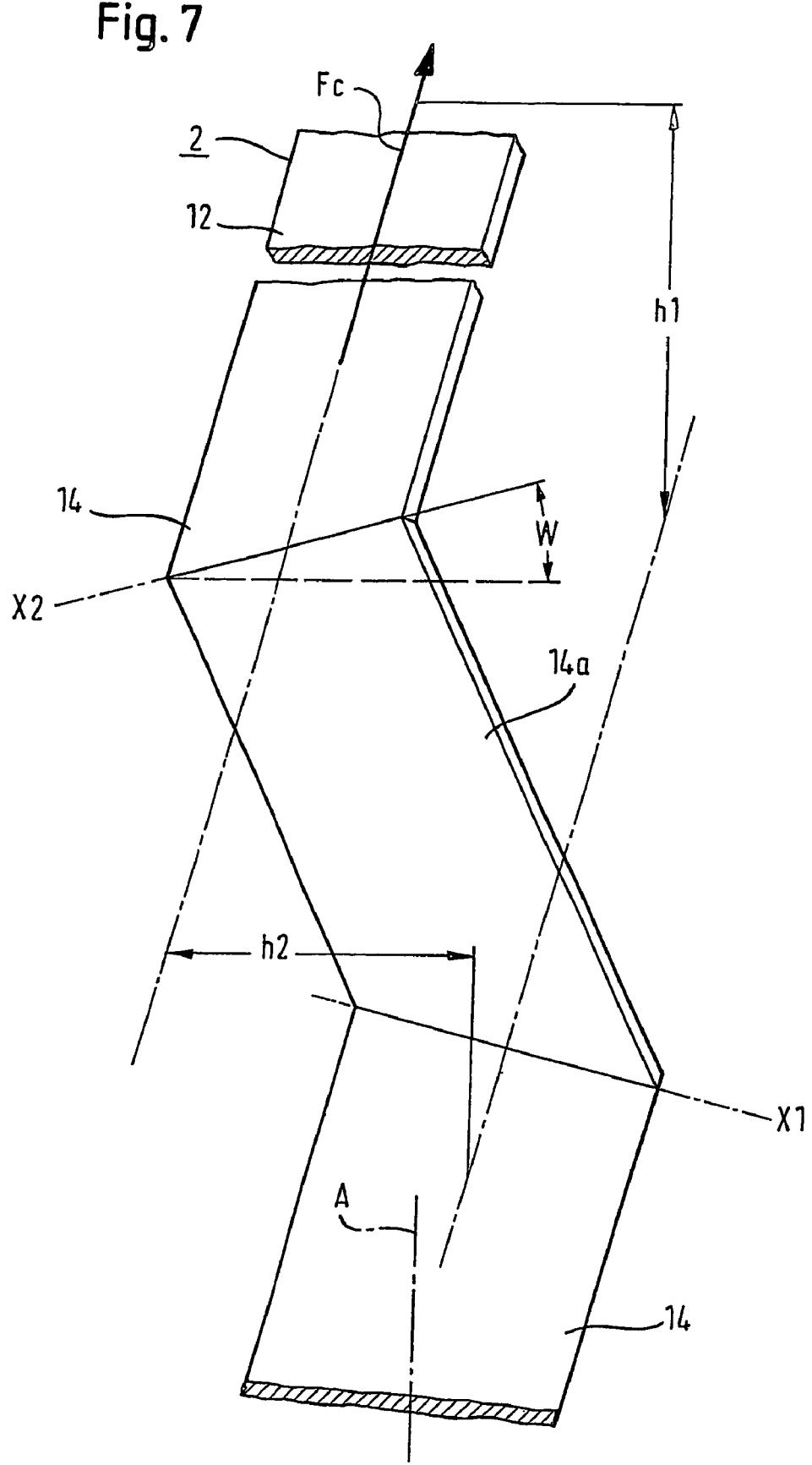
FIG. 7 is a schematic, greatly simplified perspective view of a substantial subregion of a rotor according to the present invention in accordance with a fourth embodiment.

Be it noted at this juncture that a mutual offset of the neutral fibers can be achieved even in the context of connector arms extending rectilinearly and indeed in a common plane (or in the context of a rotor-blade connector arm having only a single segment; see FIG. 7), for example by the fact that the respective connector arm possesses, for example, an inhomogeneous reinforcing fiber ply construction and/or regions having different rigidities.

In the rotor according to the present invention, each rotor blade 2 can possess, for cyclic and collective blade adjustment, e.g. a control bag (not shown) that engages on rotor-blade neck 12, for example, in the region of the integral, bearingless, centrifugal-force-controlled blade adjustment device. Other control elements suitable for this purpose are also possible.

The manner of operation of the rotor according to the present invention, and the method according to the present invention for adjusting the blade angle of a respective rotor blade 2, will now be described.

The method according to the present invention for adjusting the blade angle of rotor blade 2 is based on the fact that rotor blade 2 is caused to rotate in bearingless fashion, and blade angle W is automatically adjusted by twisting the rotor-head-side rotor-blade connector 4; 6, 8, and therefore rotor blade 2, about its longitudinal axis by means of centrifugal forces Fc acting on rotor blade 2. The magnitude of blade angle W is modified as a function of the magnitude of centrifugal forces Fc. The twisting is accomplished by contradirectional reversible elastic deformation of the two contradirectionally stepped or bent rotor-blade connector arms 6, 8, by means of centrifugal forces Fc acting on rotor blade 2. This deformation is achieved by the fact that by means of centrifugal forces Fc acting on rotor blade 2, two contradirectional flexural moments M1, M2 (see below and FIG. 4) are generated in the two rotor-blade connector arms 6, 8. These two contradirectional flexural moments M1, M2 in turn induce a torque about the longitudinal rotor-blade axis, so that a blade angle adjustment is accomplished.

Figure 3:
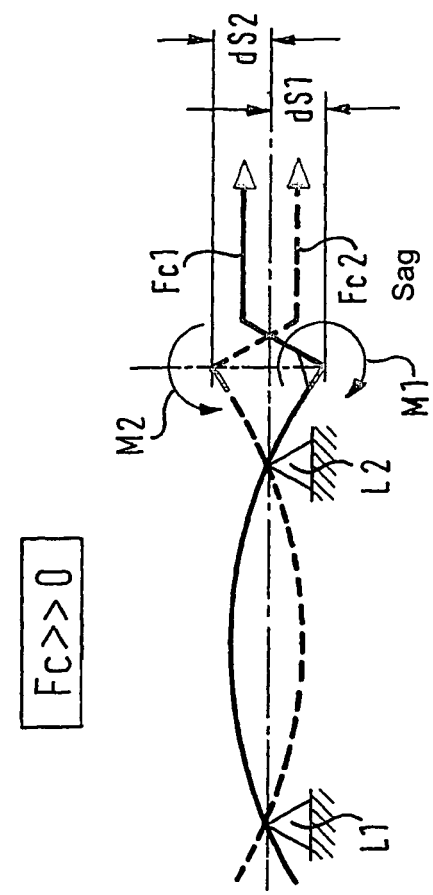
FIG. 3 is a schematic side view of the rotor of FIG. 1 in a first operating state, in order to explain the functional principle according to the present invention.
Figure 4:
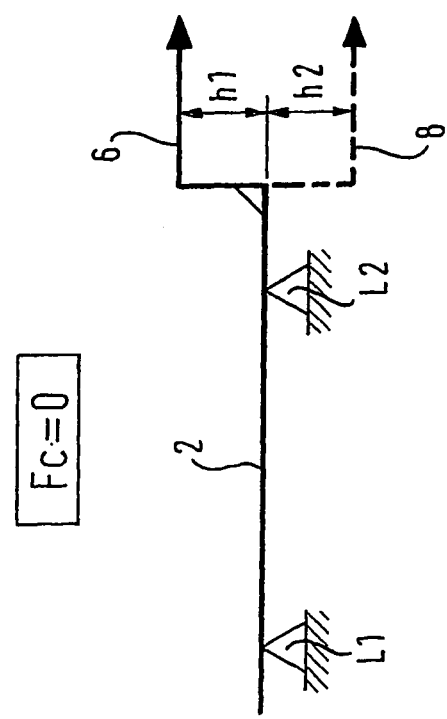
FIG. 4 is a schematic side view of the rotor of FIG. 1 in a second operating state, in order to explain the functional principle according to the present invention.

The principle set forth above will become even clearer from an examination of FIGS. 1 to 4. FIG. 3 is a schematic side view of the rotor of FIG. 1 in a first operating state in which the rotor is stationary, and FIG. 4 shows a second operating state in which the rotor is rotating. In FIGS. 3 and 4, a continuous line shows connector arm 6 and a dashed line indicates the other connector arm 8. Bearing points L1, L2 sketched in FIGS. 3 and 4 can be constituted in practice by, for example, two or more mounting points, spaced apart from one another in the longitudinal direction of rotor blade 2, of the respective connector arms 6, 8. A fixed clamping of rotor-blade connector arms 6, 8 is likewise conceivable.

With the rotor at a standstill (FIG. 3), no centrifugal forces act on rotor blade 2 and on rotor-blade connector arms 6, 8 (Fc=0). When the rotor is caused to rotate, however (FIG. 4), rotor blade 2 and rotor-blade connector arms 6, 8 are exposed to centrifugal forces (Fc>>0). The magnitude of centrifugal forces Fc is dependent, inter alia, on the rotor rotation speed. Centrifugal forces Fc are introduced into rotor-blade connector arms 6, 8, each arm receiving a specific centrifugal-force component Fc1, Fc2. The force path brought about by the centrifugal forces or centrifugal-force components extends from a centrifugal-force introduction point at rotor-blade-end connection point PB6, PB8 to the rotor-head-side connection point PH6, PH8.

Because the effects occurring in rotor-blade connector arms 6, 8 are substantially identical, the explanations below will refer, for the sake of simplicity, only to rotor-blade connector arm 6 unless further elaboration is necessary.

Because the surface centroids or neutral fibers of the respective connector arm cross sections do not extend rectilinearly over the length of rotor-blade connector arm 6 starting from the centrifugal-force introduction point (see esp. FIG. 2), the force path with reference to the centrifugal-force direction or the vector of centrifugal-force component Fc1 is also not rectilinear, but instead follows the bent or stepped profile of rotor-blade connector arm 6. A flexural moment M1 is consequently generated at the stepped or bent intermediate portion of the rotor-blade connector arm (see FIG. 4). The moment M1 has the magnitude M1=Fc1*h1, where Fc1 is the centrifugal-force component of Fc acting on the rotor-blade connector arm, and h1 is the vertical distance (lever arm) between the vector of centrifugal-force component Fc1 extending through the surface centroid of the rotor-blade-end centrifugal-force introduction point, and the surface centroid of the rotor-head-side of the stepped or bent connector arm intermediate region (or also, depending on the configuration, the surface centroid of the rotor-head-side connection point of the rotor-blade connector arm).

As a result of moment M1, a reversible elastic deformation occurs, i.e. in this case a flexion of rotor-blade connector arm 6 and, if applicable, of the structures adjacent thereto. The principle is therefore that centrifugal forces Fc (here centrifugal-force component Fc1) attempts to deform the rotor-blade connector (here rotor-blade connector arm 6) in such a way that the surface centroid profile forms a straight line with the vector of centrifugal forces Fc (here centrifugal-force component Fc1), i.e. aligns with the vector. Proceeding from the operating state shown in FIG. 3, the rotor-blade-end connection point PB6 therefore experiences, upon rotation of the rotor, a sag dS1 in response to the centrifugal force (FIG. 4).

The effect on the other rotor-blade connector arm 8 is, as mentioned, analogous, although the result of centrifugal-force component Fc2 is to cause a contradirectional flexural moment M2, and a rise dS2 instead of sag dS1 (FIG. 4). In this exemplifing embodiment, the deformations that have been described therefore occur in both rotor-blade connector arms 6, 8. Because the deformation directions are contradirectional, and a force pair F1, F2 is therefore created (cf. FIG. 1), a torque about the longitudinal rotor-blade axis is induced; connector arms 6, 8 (and, if applicable, foot region 10 and portions of rotor-blade neck 12) twist, and rotor blade 2 is rotated in bearingless fashion about its longitudinal axis.

The result is consequently an adjustment of blade angle W (cf. FIG. 1). It is evident that for a given rotor blade 2, the centrifugal forces Fc that occur, the deformations at rotor-blade connector 4; 6, 8, and the sag dS1 and rise dS2 depend directly on the rotation speed of the rotor, and blade angle W is modified automatically as a function of rotation speed. The magnitude of the change in blade angle for a given rotor rotation speed range is selectable in design terms by way of not only the aforementioned parameters, but in particular the mutual distance of rotor-blade connector arms 6, 8, the distances or lever arms h1, h2, and the flexural and torsional properties of rotor-blade connector arms 6, 8 and their material.

Be it noted explicitly at this juncture that the principle according to the present invention, as explained above, functions even when only one of the two rotor-blade connector arms 6, 8 is stepped or bent and the other rotor-blade connector arm is embodied, for example, rectilinearly, and the vector of the centrifugal-force component associated with that rectilinear arm extends through the surface centroids of the arm cross sections.

Figure 5:
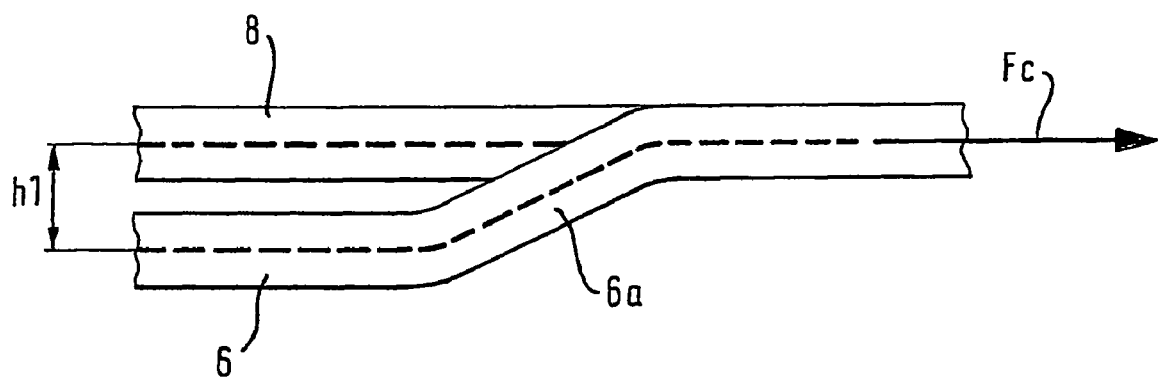
FIG. 5 is a schematic, greatly simplified side view of a rotor according to the present invention in accordance with a second embodiment.

A constellation of this kind is depicted in FIG. 5, which, by analogy with the drawing in FIG. 2, is a schematic, greatly simplified side view of a rotor according to the present invention in accordance with a second embodiment. Clearly visible behind the first, downwardly bent or stepped rotor-blade connector arm 6 is the second, rectilinear rotor-blade connector arm 8. In this variant, a centrifugal-force-conditioned flexion and deformation, and therefore sag, occurs only at rotor-blade connector arm 6. No such flexion and deformation takes place as a function of centrifugal force at the other rotor-blade connector arm 8. As a consequence of the sag at rotor-blade connector arm 6 (cf. FIG. 4), however, a reaction force occurs at the other, rectilinear rotor-blade connector arm 8. Similarly to what is depicted in FIG. 1, the result thereof is once again a force pair F1, F2 that twists the rotor-blade connector and brings about the blade angle adjustment. For an identical distance or lever arm h1 and identical dimensions and material properties of the blade connector elements, the magnitude of the adjusted blade angle W is smaller for the embodiment according to FIG. 5 than for the embodiment according to FIGS. 1 and 4.

Figure 6:
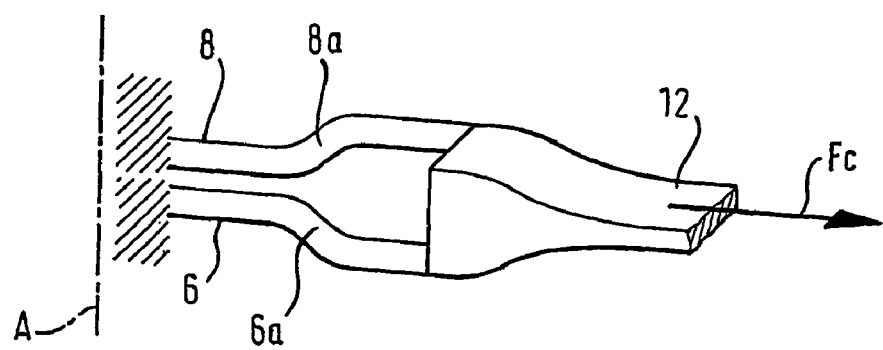
FIG. 6 is a schematic, greatly simplified perspective view of a substantial subregion of a rotor according to the present invention in accordance with a third embodiment.

FIG. 6 is a schematic, greatly simplified perspective view of a substantial subregion of a rotor according to the present invention in accordance with a third embodiment. In this variant, rotor-blade connector arms 6, 8 are disposed one above another with reference to rotor axis A, and extend at an axial distance from one another. Rotor-blade connector arms 6, 8 or their arm portions are stepped or bent contradirectionally to the left and right (here in a tangential direction), substantially in a plane parallel to the rotor-disc plane (or at a preferably relatively small, acute angle thereto). The embodiment according to FIG. 5 is not as physically flat as that of FIGS. 1 to 4, but it can be embodied with greater lead-lag softness than the latter, which is likewise advantageous for certain purposes.

FIG. 7 represents a schematic, greatly simplified perspective view of a substantial subregion of a rotor according to the present invention in accordance with a fourth embodiment. The viewing direction extends from the rotor head (not shown) toward the rotor-blade tip (not shown). This variant possesses, for each rotor blade 2, only a single rotor-blade connector arm 14, which in this case is embodied in strip-shaped fashion and has a stepped or bent arm portion 14a having two obliquely extending bend axes X1, X2. As a result of this stepping or bending there is formed, between a rotor-head-side connection point of rotor-blade connector arm 14 and a vector of a centrifugal force Fc acting on rotor blade 2, at least one lever arm with which rotor-blade connector arm 14 is twisted in response to centrifugal forces Fc, and an adjustment of blade angle W is thus effected. Stated more precisely, two lever arms h1 and h2 are present here: h1 in the axial direction of the rotor, and h2 in a tangential direction with reference to the rotor disc. In the case of the rotor of FIG. 7, blade angle W is decreased as the rotation speed is raised.

Two connector arms 14 can, for example, also be disposed in a configuration similar to FIG. 1, next to one another and preferably slightly offset from one another in the axial direction of the rotor. What results from this during rotor operation, at the respective bent or stepped arm portions 14a, is flexural moments that are not contradirectional but codirectional, which nevertheless effect a centrifugal-force-conditioned twisting of the rotor blade about the longitudinal rotor-blade axis and therefore an adjustment of the blade angle.

The rotor according to the present invention is used in a rotorcraft, for example a helicopter or tiltrotor helicopter.

The invention is not limited to the exemplifying embodiments above, which serve merely for general explanation of the central concept of the invention. To the contrary, within the scope of protection the rotor according to the present invention can also assume embodiments different from those described concretely above. The rotor can, in particular, exhibit features that represent a combination of the features of the main claim and all or only some dependent claims. The rotor-blade connector arms can also extend at an offset one above another or can cross over one another, and the bends or steps of their arm portions can be made in directions other than the axial or tangential direction described. The bends or steps need not extend only in one plane; they can also be embodied in three dimensions, as for example in FIG. 7. The rotor-blade connector arms can moreover be embodied as an integral component of a rotor-head element, e.g. a rotor-head plate, to which one or more rotor blades are connectable.

It is moreover possible to embody the connector arms or one individual connector arm in internally twisted fashion, or multiple connector arms in intertwisted fashion. For purposes of the invention, at least two connector arms can also be embodied, for example in the form of centrifugal-force-discharging tensile segments, as an integral component of an individual blade connector element that partially or substantially completely surrounds or encloses the connector arms. Multiple connector arms can also be disposed next to and/or above one another at a very small distance. A region between the connector arms can furthermore be provided with a soft, elastic intermediate filling, e.g. an elastic foam or the like, which does not prevent deformation of the connector arms and can additionally perform enclosing, supporting, or stiffening functions. In the above embodiments, the rotor-blade neck can moreover also be configured in torsionally and/or flexurally soft fashion. Mixed forms of the embodiments explained above are also conceivable according to the present invention.

Be it explicitly noted once again that the drawings above are purely schematic, and that the components shown, and in particular the bends or steps of the rotor-blade connector arms, therefore need not be made as angular and sharp-edged as depicted in the Figures, but instead possess transitions and component profiles that are correspondingly softer and appropriate to the material.

Reference characters in the claims, the description, and the drawings serve merely for better comprehension of the invention, and are not intended to limit the scope of protection.

What is claimed is:

1. A method for adjusting a blade angle of a rotor blade of a rotorcraft rotor that includes a rotor head and a rotor-head-end bearingless rotor-blade connector, the method comprising:
rotating the rotor blade so as to create a centrifugal force acting on the rotor blade; and
twisting the rotor-head-end bearingless rotor-blade connector using the centrifugal force so that the rotor blade is twisted about a longitudinal axis of the rotor blade so as to automatically adjusting a blade angle.

2. The method as recited in claim 1, wherein the rotorcraft rotor is a bearingless rotorcraft rotor.

3. The method as recited in claim 1, wherein a rotor-head-end bearingless rotor-blade connector includes at least one rotor-blade connector arm, and wherein the twisting is performed using reversible elastic deformation of the at least one rotor-blade connector arm using the centrifugal force.

4. The method as recited in claim 3, wherein the reversible elastic deformation is accomplished by generating at least one flexural moment in the at least one rotor-blade connector arm using the centrifugal forces, the flexural moment inducing a torque about the longitudinal rotor-blade axis.

5. The method as recited in claim 1, wherein the twisting is performed by contradirectional reversible elastic deformation of at least two codirectionally or contradirectionally staggered or angled rotor-blade connector arms using the centrifugal force.

6. The method as recited in claim 5, wherein the reversible elastic deformation is accomplished by generating two codirectional or contradirectional flexural torques in the two rotor-blade connector arms using the centrifugal force, the codirectional or contradirectional flexural moments inducing a torque about the longitudinal rotor-blade axis.

7. A rotorcraft rotor comprising:
a rotor head;
at least one rotor blade; and
a rotor-head-end rotor-blade connector having an integral, bearingless, centrifugal-force-controlled blade angle adjustment device.

8. The rotoreraft rotor as recited in claim 7, wherein the integral, bearingless, centrifugal-force-controlled blade angle adjustment device includes at least one rotor-blade connector arm impinged upon by centrifugal force during rotor operation and having a rotor-head-end connection point and at least one staggered or angled arm portion formed between the rotor-head-end connection point and a vector, wherein the vector is one of a centrifugal force acting on the at least one rotor blade, and a component of the centrifugal force acting on the at least one rotor-blade connector arm, and wherein the staggered or angled arm portion forms at least one lever arm with which the rotor-blade connector arm and the rotor blade are twistable in response to the centrifugal force.

9. The rotorcraft rotor as recited in claim 8, wherein the rotor blade includes a rotor blade neck, wherein the integral, bearingless, centrifugal-force-controlled blade angle adjustment device includes a foot region terminating in the rotor-blade neck, and at least one of the rotor-blade connector arm, the foot region, and the rotor-blade neck are configured in torsionally soft fashion.

10. The rotorcraft rotor as recited in claim 8, wherein the at least one rotor-blade connector arm is an integral component of the rotor blade.

11. The rotorcraft rotor as recited in claim 8, further comprising a rotor-head element connectable to the at least one rotor blade, wherein the at least one rotor-blade connector arm is an integral component of the rotor-head element.

12. The rotorcraft rotor as recited in claim 11, wherein the foot region is embodied in lead-lag-stiff and flapwise-soft fashion.

13. The rortorcraft rotor as recited in claim 7, wherein the rotor blade includes a rotor blade neck, wherein the integral, bearingless. centrifugal-force-controlled blade angle adjustment device includes a foot region terminating in the rotor-blade neck, and wherein the at least one least one rotor-blade connector arm includes at least two rotor-blade connector arms impinged upon by centrifugal force during rotor operation and extending from the foot region at a distance from one another, and wherein at least one of the at least two rotor blade connection arms includes an arm portion that is staggered or angled with respect to another of the at least two rotor-blade connector arms.

14. The rotorcraft rotor as recited in claim 13, wherein the at least two rotor-blade connector arms include contradirectionally staggered or angled arm portions.

15. The rotorcraft rotor as recited in claim 13, wherein the at least two rotor-blade connector arms extend next to one another at a lateral distance from one another in a tangential direction with reference to the rotor disc, and wherein the arm portions of each are offset from one another in an axial direction with reference to an axis of the rotor.

16. The rotorcraft rotor as recited in claim 13, wherein the at least two rotor-blade connector anns are disposed one above another with reference to an axis of the rotor axis and extend at a distance from one another, and wherein the arm portions of each are staggered or angled contradirectionally to the left and right substantially in a plane that is one of parallel to a rotor-disc plane and at an acute angle to the rotor-disc plane.

17. The rotorcraft rotor as recited in claim 13, wherein each rotor-blade connector arm includes a rotor-head-end having a first cross-section and a blade-end having a second cross-section, and wherein a first surface centroid or neutral fiber of the first cross-section is offset with respect to a second surface centroid or neutral fiber of the second cross-section and a centrifugal-force direction extending, during operation of the rotor, through the second surface centroid.

18. The rotorcraft rotor as recited in claim 13, wherein each of the at least two rotor-blade connector arms have a rotor-head-end connection points spaced apart from one another in an axial direction with reference to an axis of the rotor.

19. The rotorcraft rotor as recited in claim 7, wherein the rotor is part of a rotorcraft.

20. A rotorcraft comprising at least one rotorcraft rotor as recited in claim 7.

* * * * *